US009171442B2

(12) United States Patent
Clements

(10) Patent No.: US 9,171,442 B2
(45) Date of Patent: Oct. 27, 2015

(54) ITEM IDENTIFICATION USING VIDEO RECOGNITION TO SUPPLEMENT BAR CODE OR RFID INFORMATION

(75) Inventor: Scott M. Clements, Delray Beach, FL (US)

(73) Assignee: Tyco Fire & Security GmbH, Neuhausen am Rheinfall (CH)

( * ) Notice: Subject to any disclaimer, the term of this patent is extended or adjusted under 35 U.S.C. 154(b) by 300 days.

(21) Appl. No.: 12/950,149

(22) Filed: Nov. 19, 2010

(65) Prior Publication Data

US 2012/0127314 A1 May 24, 2012

(51) Int. Cl.

| | |
|---|---|
| ***H04N 7/18*** | (2006.01) |
| ***G06K 9/00*** | (2006.01) |
| ***G06K 5/00*** | (2006.01) |
| ***G08B 13/24*** | (2006.01) |
| ***G07G 1/00*** | (2006.01) |

(52) U.S. Cl.

CPC ............ *G08B 13/248* (2013.01); *G07G 1/0063* (2013.01); *G08B 13/246* (2013.01)

(58) Field of Classification Search

CPC .. G08B 13/246; G08B 13/248; G07G 1/0063; H04N 7/18; G06K 9/00; G06K 5/00

USPC ..................... 235/462.01, 439; 348/150, 135; 382/181; 705/28, 8, 64; 353/70; 386/126

See application file for complete search history.

(56) References Cited

U.S. PATENT DOCUMENTS

| | | | | |
|---|---|---|---|---|
| 8,462,206 | B1 * | 6/2013 | McGuire et al. | 348/135 |
| 2004/0141157 | A1 * | 7/2004 | Ramachandran et al. | 353/70 |
| 2006/0028552 | A1 | 2/2006 | Aggarwal et al. | |
| 2006/0059107 | A1 * | 3/2006 | Elmore et al. | 705/64 |
| 2006/0184410 | A1 * | 8/2006 | Ramamurthy et al. | 705/8 |
| 2008/0077511 | A1 * | 3/2008 | Zimmerman | 705/28 |
| 2008/0142599 | A1 * | 6/2008 | Benillouche et al. | 235/462.41 |
| 2008/0267504 | A1 * | 10/2008 | Schloter et al. | 382/181 |
| 2008/0283599 | A1 * | 11/2008 | Rasband et al. | 235/439 |
| 2008/0292287 | A1 * | 11/2008 | Oshima et al. | 386/126 |
| 2008/0296382 | A1 * | 12/2008 | Connell et al. | 235/462.01 |
| 2009/0039165 | A1 | 2/2009 | Collins, Jr. et al. | |
| 2009/0322537 | A1 | 12/2009 | Tapp et al. | |

FOREIGN PATENT DOCUMENTS

DE 10 2008 005 177 A1 11/2008

OTHER PUBLICATIONS

EPO International Search Report dated Apr. 10, 2012 for corresponding appln PCT/US11/001906.

* cited by examiner

*Primary Examiner* — Geepy Pe
*Assistant Examiner* — Salame Amr
(74) *Attorney, Agent, or Firm* — Alan M. Weisberg; Christopher & Weisberg, P.A.

(57) ABSTRACT

A method and system for confirming the identity of a product in a security system and for determining sales-related information pertaining to the products. One or more products are associated with a product identification element, such as a bar code or an RFID tag. A reader or a scanner within the system receives a signal from the product identification element containing product identity information about the product. The system further includes a camera that captures a video image of the product. Signals representing the product identity information and the video image of the product are forwarded to a data correlation unit that determines if the product associated with the product identity information matches the product in the video image.

12 Claims, 6 Drawing Sheets

ITEM IDENTIFICATION USING VIDEO RECOGNITION TO SUPPLEMENT BAR CODE OR RFID INFORMATION

CROSS-REFERENCE TO RELATED APPLICATION n/a

STATEMENT REGARDING FEDERALLY SPONSORED RESEARCH OR DEVELOPMENT n/a

FIELD OF THE INVENTION

The present invention relates generally to security systems and more specifically to a method and system for correlating product identification data with video data in order to more accurately determine the identity of products removed from a monitored location.

BACKGROUND OF THE INVENTION

Bar code technology has been in existence since the early 1950s. Retail stores, particularly supermarkets, starting using bar codes on products that contain data that identifies the product to which the bar code is affixed. When the bar code is scanned, the product information, i.e., a product number, is sent to a host database that associates the number with a record in its database that holds information about the product. The required information, i.e., the price, is then transmitted back to the checkout counter.

Radio frequency identification ("RFID") systems are also generally known in the art and are used in a variety of applications, including automated tracking, identifying and authenticating of items, security systems and managing inventory. A RFID system typically includes one or more readers (also commonly referred to as interrogators) and RFID tags (also commonly referred to as markers or transponders). The RFID reader transmits a radio-frequency carrier signal to the RFID tag. The RFID tag may respond to the carrier signal with a data signal encoded with information stored by the RFID device. RFID readers are typically positioned at locations where it is desired to control or receive information from the RFID tags that are affixed to items, such as goods, assets, documents or livestock. Reader locations may include entry and/or exit points, inventory control points, or transaction terminals.

While barcode and RFID systems provide important information to a retail store, for example, informing the store owner what products are being purchased, the barcode system or the RFID system need not be the exclusive system for determining the identification of products. Certain scenarios dictate that an additional layer of surveillance is desired. For example, camera surveillance might be beneficial in addition to barcode or RFID information in order to protect the unauthorized purchase of items, to evaluate purchasing dynamics such as what products are purchased from which store locations, by whom and when, and to more accurately and more quickly determine the level of items in a store's inventory.

An example of how a wrongdoer might manipulate an existing barcode or RFID system in order to pay less for an expensive item is known in the art as "sweethearting." In sweethearting, a wrongdoer selects an item, often an expensive item, from a store's shelves and takes the item to the checkout counter (also referred to as the "Point of Sale" or "POS"). The prospective purchaser has a confederate that works for the store at the POS. Instead of scanning the item, which contains a valid RFID tag or barcode that identifies the product and its purchase price, the cashier covers the product's tag and instead sweeps an alternate bar code taped to his or her wrist or even a less expensive product. The alternate bar code identifies a different item that costs less than the item brought to the POS by the wrongdoer. Thus, the wrongdoer ends up paying less for the product. It is desirable to have a system and method which can be used to visually verify that the item brought to the POS for purchase is actually the item being rung up, i.e., entered into the POS system.

Also, while a barcode or RFID system determines when items are being purchased, they often fall short of supplying other information such as when an item was removed from a store's shelves, the type of person that removed the item from the shelf (i.e., sex, age of the purchaser), and how long the purchaser lingered in from of a store's shelf or cart before actually selecting the item. Further, while RFID tags on items in inventory can be quickly scanned to determine how many of a particular item are stored in inventory, the scanning of items only occurs at specific times, e.g., at the end of the day or at the end of the week. Obtaining "real time" information regarding a store's inventory cannot accurately be obtained. In other words, the inventory information is only as accurate as the last RFID system "sweep."

What is therefore needed is a system and method for correlating video information with RFID product identification information in order to provide a more robust and effective product management, identification and security system.

SUMMARY OF THE INVENTION

The present invention advantageously provides a method and system for confirming the identity of a product in a security system and for determining sales-related information pertaining to the products. One or more products are associated with a product identification element, such as a bar code or an RFID tag. A reader or a scanner within the system receives a signal from the product identification element containing product identity information about the product. The system further includes a data capture device that captures a video image of the product. Signals representing the product identity information and the video image of the product are forwarded to a data correlation unit that determines if the product associated with the product identity information matches the product in the video image.

In one aspect of the invention, a method for confirming the identity of a product in a security system is provided. The method includes receiving a signal from a product identification element associated with the product, where the signal contains product identity information. The method further includes receiving a video image of the product, correlating the product identity information with the video image of the product, and determining if the product associated with the product identity information matches the product in the video image.

In another aspect of the invention, a method of using video analytics to obtain sales related information is provided. The method includes capturing a video image of an area, the area including products on a product support structure, receiving product identification signals from a product identification element associated with the product on the product support structure, and determining characteristics relating to sales of the products from the video image and the product identification signals.

In yet another aspect of the invention, a system for confirming the identity of a product is provided. The system includes a reader in communication with at least one product identification element, where each product identification element is associated with a product. The reader receives a signal containing product identity information from the at least one product identification element. The system further includes a data capture device for capturing an image of at least one product within a viewing area. The system also includes a data correlation unit. The data correlation unit receives a signal from the reader, the signal containing the product identity information, receives a signal from the data capture device, the signal representing the image of the at least one product, and compares the signal received from the reader with the signal received from the data capture device.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION OF THE INVENTION

Figure 1:
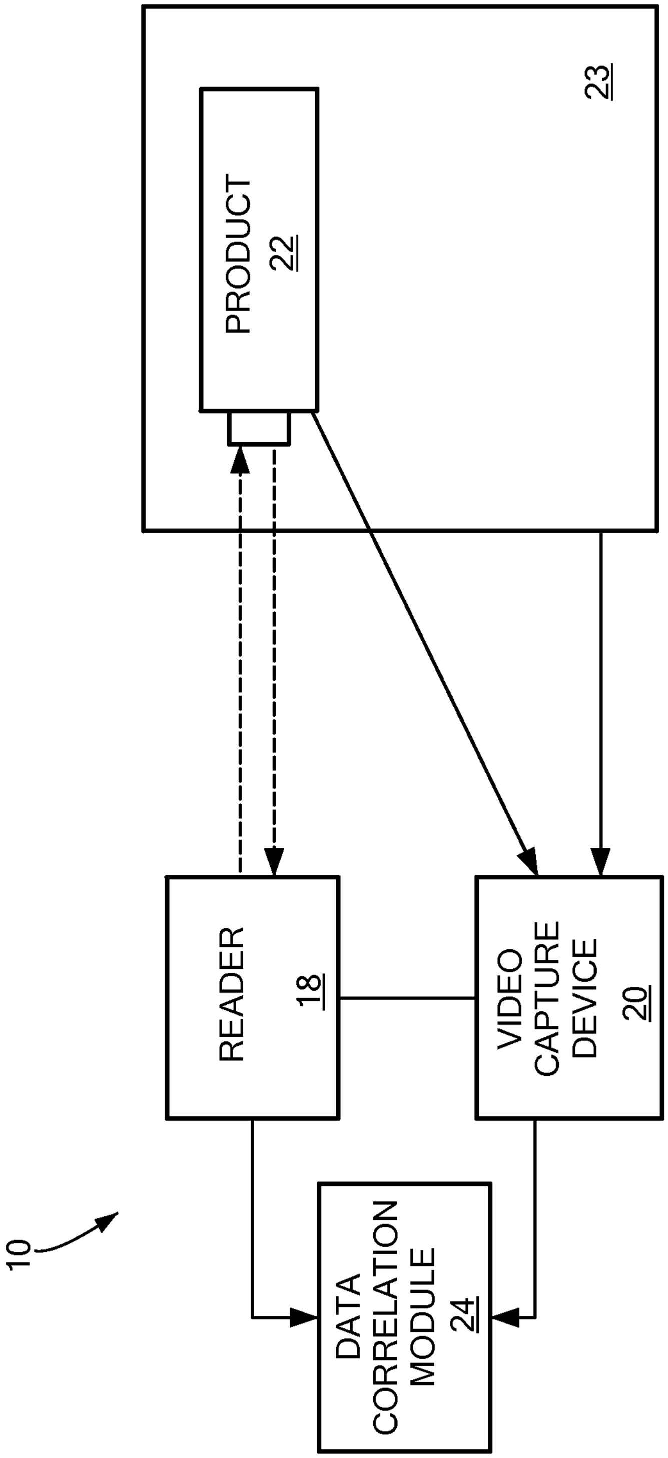
FIG. 1 is a block diagram of an exemplary system for correlating video information with product information in accordance with the principles of the present invention.

Before describing in detail exemplary embodiments that are in accordance with the present invention, it is noted that the embodiments reside primarily in combinations of apparatus components and processing steps related to implementing a system and method for correlating both video data and RFID product identification data in order to provide a more accurate and robust inventory, product management, and theft-deterrent system. Accordingly, the system and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

As used herein, relational terms, such as “first” and “second,” “top” and “bottom,” and the like, may be used solely to distinguish one entity or element from another entity or element without necessarily requiring or implying any physical or logical relationship or order between such entities or elements.

One embodiment of the present invention advantageously provides a method and system for confirming the identity of a product in a security system and for determining sales-related information pertaining to the products. One or more products are associated with a product identification element, such as a bar code or an RFID tag. A reader or a scanner within the system receives a signal from the product identification element containing product identity information about the product. The system further includes a camera that captures a video image of the product. Signals representing the product identity information and the video image of the product are forwarded to a data correlation unit that determines if the product associated with the product identity information matches the product in the video image. Video images of shoppers purchasing the products are also captured in order to determine shopper buying habits and to obtain shopper demographic information. Further, based upon the captured video images, information regarding the placement and location, within the store, of product displays, can be used to determine if the product displays are effective or need to be moved to an alternate location within the store.

The present disclosure will be understood more fully from the detailed description given below and from the accompanying drawings of particular embodiments of the invention which, however, should not be taken to limit the invention to a specific embodiment but are for explanatory purposes.

Referring now to the drawing figures in which like reference designators refer to like elements, there is shown in FIG. 1 a block diagram of an exemplary configuration of a system 10 for correlating video and product identification information in order to provide a more efficient product management, inventory and security system. System 10 includes a product a video capture device 20, and a reader 18, each of which communicate with a data correlation module 16. Video capture device 20 can be any device that captures video, audio or both video and audio and can communicate signals representing both video and audio. Video capture device can capture and transmit either analog or digital signals, or both, and can communicate with a server using, for example, TCP/IP. For example, video capture device 20 can be a video camera adapted to receive video signals from a product and/or other images within the viewing range of video capture device 20. Video capture device 20 may be any type of camera capable of capturing still or moving video images including wireless cameras, dome cameras, IP cameras, and pan-tilt-zoom (“PTZ”) cameras. Reader 18 receives product identification information via a signal generated by a product identification device 18 affixed or otherwise associated with a product 22, situated within a surrounding area 23. Video capture device 20 captures video images of product 22 and images within surrounding area 23. Product 22 could be one of many products, for example, stored on store shelves, or end caps, on a store product cart, or situated on a conveyor belt proximate a point of service (“POS”). Surrounding area 23 could include any area proximate product 22 that is within the capture range of video capture device 20.

Figure 2:
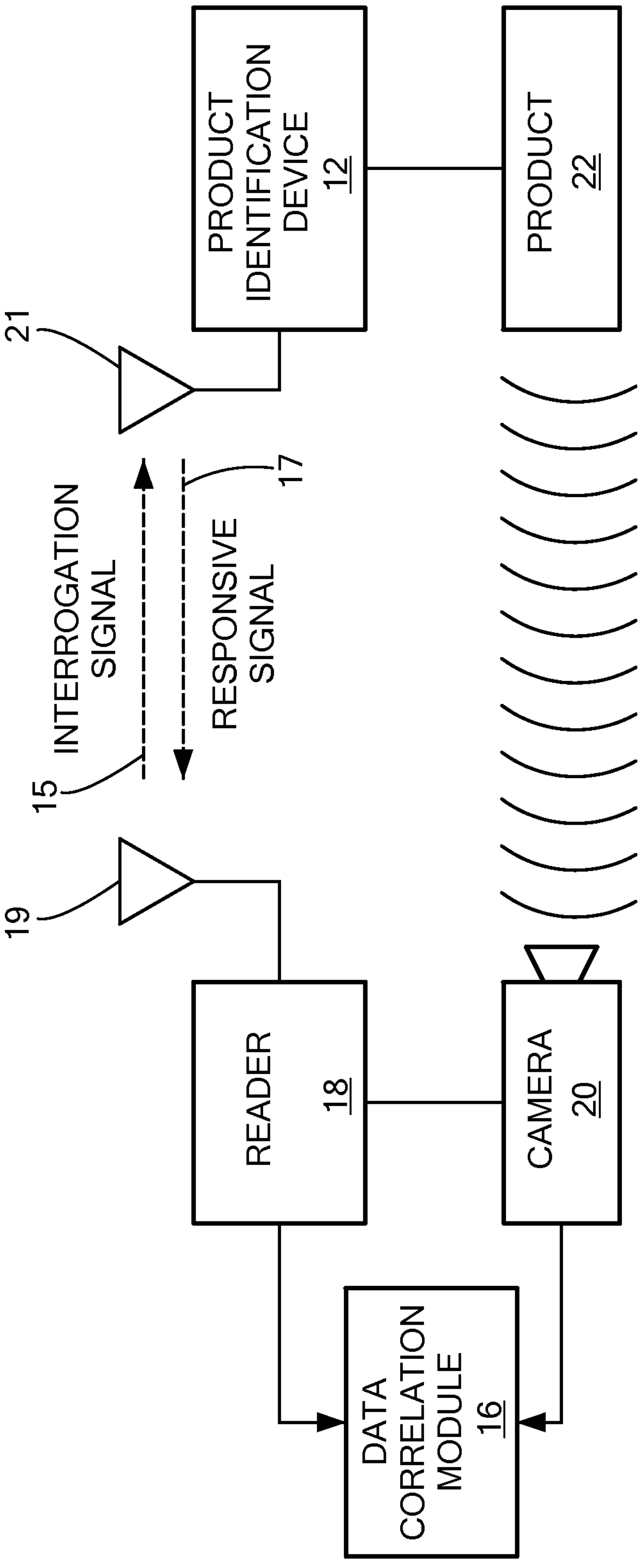
FIG. 2 is a block diagram of an exemplary system for correlating video information with RFID product information in accordance with the principles of the present invention.

In one embodiment, product identification element 12 is a bar code affixed or otherwise associated with product 22. A scanner can be used to scan the bar code in order to obtain information related to the identity of product 12. Other types of product identification elements 12 are also contemplated including an RFID tag or label. FIG. 2 illustrates one embodiment of the invention where product identification device 12 is an RFID tag. Radio frequency communications can occur between remote product identification device 12 and an RFID reader 18 for use in identification systems and product monitoring systems as exemplary applications. Multiple wireless product identification devices 12 typically communicate with reader 18 although only one such device 12 is illustrated in FIG. 2.

Although product identification devices 12 can be employed in system 10, there is typically no communication between multiple product identification devices 12 themselves. Instead, the product identification devices 12 communicate with reader 18. Multiple product identification devices 12 can be used in the same field of reader 18, i.e., within the communication range of reader 18. Similarly, multiple readers 18 can be in proximity to one or more of devices 12. Reader 18 can be a directional reader, a handheld RFID reader, a shelf reader or a reader situated proximate the POS. The invention is not limited to the type of reader 18 used to identify product 22.

Remote product identification device 12 is configured to interface with reader 18 using a wireless medium in one embodiment. More specifically, communication between communication device 12 and reader 18 occur via an electromagnetic link, such as an RF link e.g., at microwave frequencies in the described embodiment. Reader 18 is configured to output forward link wireless communication signals 15. Further, reader 18 is operable to receive return link wireless communication signals 17 e.g., a reply signal from devices 12 responsive to the outputting of forward link communication signals 15. In accordance with the above, forward link communication signals and return link communication signals are wireless signals, such as radio frequency signals. Other forms of electromagnetic communication signals, such as infrared, acoustic, and the like are possible.

Reader 18 includes at least one antenna 19 as well as transmitting and receiving circuitry, similar to that implemented in devices 12. Antenna 19 comprises a transmit/receive antenna connected to reader 18. In an alternative embodiment, reader 18 can have separate transmit and receive antennas.

In operation, reader 18 transmits a forward link communication signal 15 e.g., an interrogation command signal via antenna 19. Product identification device 12 operates to receive the incoming forward link signal 15 via antenna 21. Upon receiving signal 15, product identification device 12 responds by communicating the responsive return link communication signal 17, e.g., a responsive reply signal.

In one embodiment, responsive return link communication signal 17 e.g., a responsive reply signal is encoded with information that uniquely identifies, or labels the particular device 12 that is transmitting, so as to identify, for example, product 22 with which product identification device 12 is associated. Product identification device 12 can be an RFID tag that are attached or otherwise associate to objects or people where each tag is programmed with information relating to product 22 to which it is attached. The information may take a wide variety of forms and may be more or less detailed depending on the intended use of the information. For example, the information may include merchandise identification information, such as a universal product code. A tag may include identifying information and security clearance information for an authorized person to whom the tag has been issued. A tag may also have a unique serial number, in order to uniquely identify an associated product 22. Alternatively, a tag may include more detailed information relating to product 22, such as a complete description of the product 22. As a further exemplary alternative, a tag may store a single bit, in order to provide for theft control or simple tracking of entry and departure through the detection of an object or person at a particular reader, without necessarily specifically identifying the object or person.

More specifically, product identification device 12 is configured to output an identification signal within reply link communication 17 responsive to receiving forward link wireless communication 15. Reader 18 is configured to receive and recognize the identification signal within the reply link communication signal 17 e.g., return signal. The identification signal can be utilized to identify the particular transmitting product identification device 12 and to provide information about product 22 to which product identification device 12 may be affixed.

In one embodiment, video capture device is a camera 20. Data correlation module 16 is connected to and receives signals from reader 18 and camera 20. Data correlation module 16 may include a processor, a tangible data storage device, random access memory ("RAM"), and hardware and software necessary to communicate with both reader 18 and camera 20. Data correlation module 16 may receive data signals from reader 18 and camera 20 via either a wired or wireless connection. A processor within data correlation module 16 compares the RFID data received from reader 18 with the video data received from camera 20.

Data correlation module 16 stores digital images that are used for comparison with the incoming image signals from camera 20 in order to identify the product images captured by camera 20. The stored image data can be stored in a database for retrieval and comparison with captured product images for subsequent identification. The database of stored images need not be stored within data correlation module 16 but can be stored remotely from the retail location such as in a central database accessible over a wireless connection such as the internet so that multiple retail stores can share the same database of stored images. As will be described in more detail below, certain actions can be taken after data correlation module 16 determines the identity of product 22 by analyzing the image captured by camera 20. Data correlation module 16 can further confirm the identity of product 22 by analyzing the product identification information obtained by reader 18 and determining if product 22 associated with the product identification information matches the image captured by camera 20. Reader 18 and camera 20 may be two separate entities or may be contained in a single structure, i.e. a multi-functional edge device 24.

Multi-functional edge device 24 is a device that houses both reader 18 and camera 20. Edge device 24 is placed at a location where it is capable of receiving product identification signals from product identification device 12 and can also receive video images of each product 22 contained in the product storage structure as well as video images of surrounding area 23. Multi-functional edge device 24 then transmits a signal containing product identification data obtained by reader 18 and a signal corresponding to the video images captured by camera 20 to data correlation module 16. Data correlation module 16 can use the product identification information to confirm that the product image captured by camera 20 represents the product 22 identified by the product identification device 12. A processor within data correlation module 16 operates to determine whether actions are to be taken as a result of the comparison between the two signals. For example, if data correlation module 16 determines product 22 is being purchased legitimately then an indication can be given to the checkout person at the POS that the purchase is a proper one. On the other hand, if it is determined that the image of the product 22 captured by camera 20 is different from the product identified by the reader 18, an alarm signal can be activated.

Figure 3:
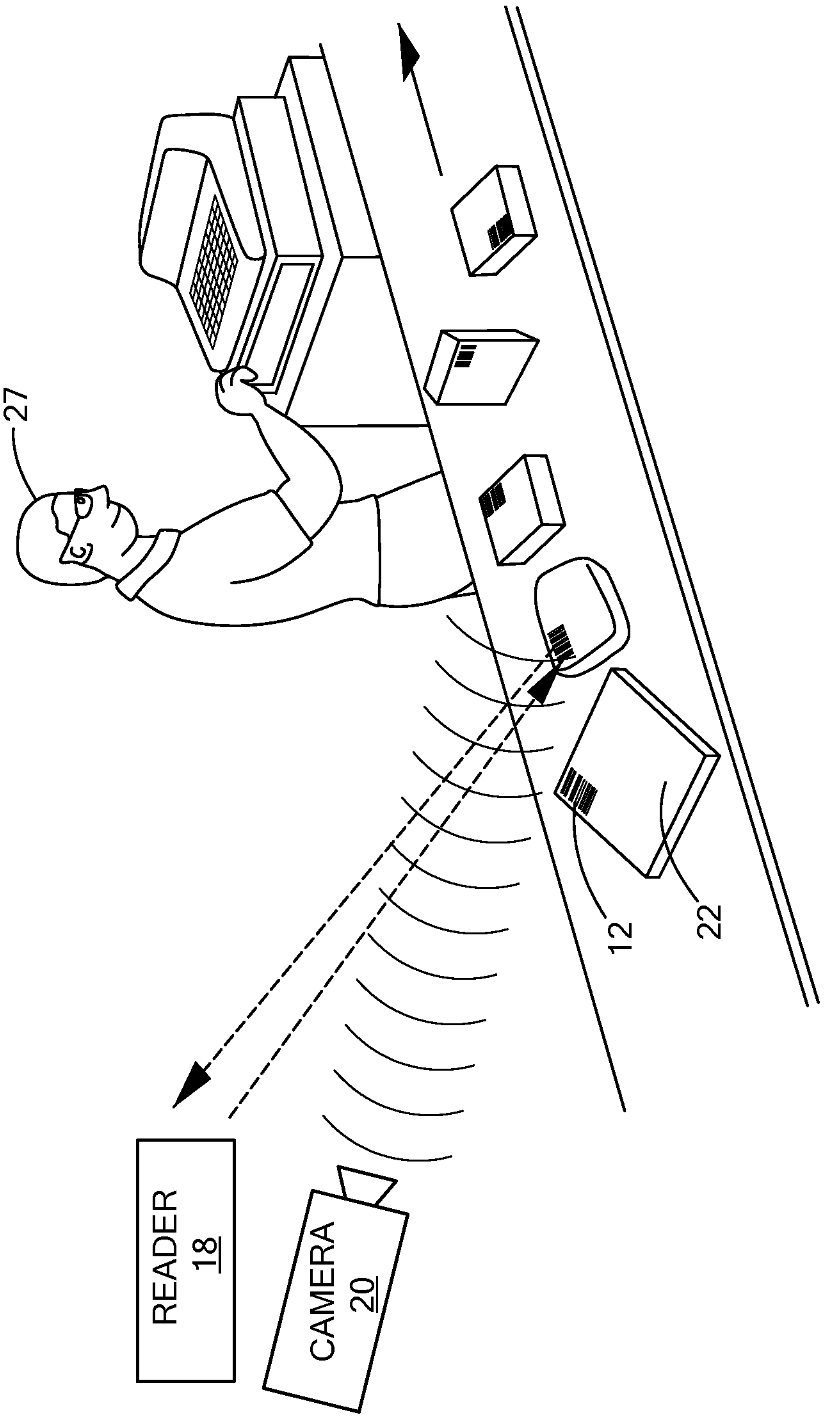
FIG. 3 a depiction of an exemplary application of the system of FIG. 1 employed at a point-of-service location.

FIG. 3 is an illustration of an exemplary embodiment of system 10. In FIG. 3, a scene at a POS is shown. Product 22 is brought to a POS for purchase. In one scenario, a potential purchaser places the product 22 on a conveyor belt, and salesperson 27 swipes product 22 over a barcode scanner or RFID reader 18 in order to allow system 10 to read the information from product identification device, or tag 16. The information obtained by reader 18 could include the price of product 22. However, the potential purchaser and salesperson 27 may be conspiring to pay less than the price of product 22. This can be accomplished in a number of ways. One way is for the salesperson 27 to have a substitute bar code in his or her possession and to swipe the substitute bar code instead of the bar code on product 22, where the substitute bar code corresponds to a lower priced item that is different from product 22. Often, this is done by using a substitute bar code strapped to the salesperson's wrist, out of site. In this fashion, product 22 is purchased for less than the sales price.

System 10 provides an RFID reader 18 that interrogates tag 12 affixed or otherwise associated with product 22 at the POS. Reader 18 receives a responsive signal 17 that identifies product 22. In addition to reader 18, camera 20 is also positioned to include POS and its surrounding area 23 within its field of view. Thus, product 22 is scanned or read by reader 18 at the POS at substantially the same time as product 22 is detected by camera 20. Signals are then transmitted from reader 18 and camera 20 to data correlation module 16 where the signals are decoded and analyzed. Data correlation module 16 can be located either at the store where the attempted purchase is taking place or at a remote location where information related to the signals received from reader 18 and camera 20 can be uploaded to a server and analyzed. If the product 22 image captured by video camera 20 is different than the product 22 associated with the scanned bar code or RFID tag 12, then certain actions could be taken. The mismatch might mean that a "sweethearting" attempt is underway where the tag 12 being scanned is different than the tag 12 associated with the product 22 being purchased. If this occurs, an audible and/or visual alarm can be activated, or store personnel or a security guard can be notified.

In the embodiment shown in FIG. 3, system 10 can be used to advantageously prevent the unauthorized purchase of an item by utilizing the video image captured by camera 20 and comparing it to the information received by reader 18 from tag 12. Tag 12 transmits responsive signal 17 to reader 18. This allows product 22 to which tag 12 is affixed or otherwise associated with to be identified. Camera 20 can be used to confirm that the image of product 22 captured by camera 20 is the same as the product 22 associated with tag 12. If the image of product 22 captured by camera 20 is the same as the product identified in responsive signal 17, the purchasing event is considered legitimate. If, however, there is a discrepancy between the image of product 22 captured by camera 20 and the product 22 identified in responsive signal 17, then any number of actions, including the alarm/alert actions identified above, can occur.

Figure 4:
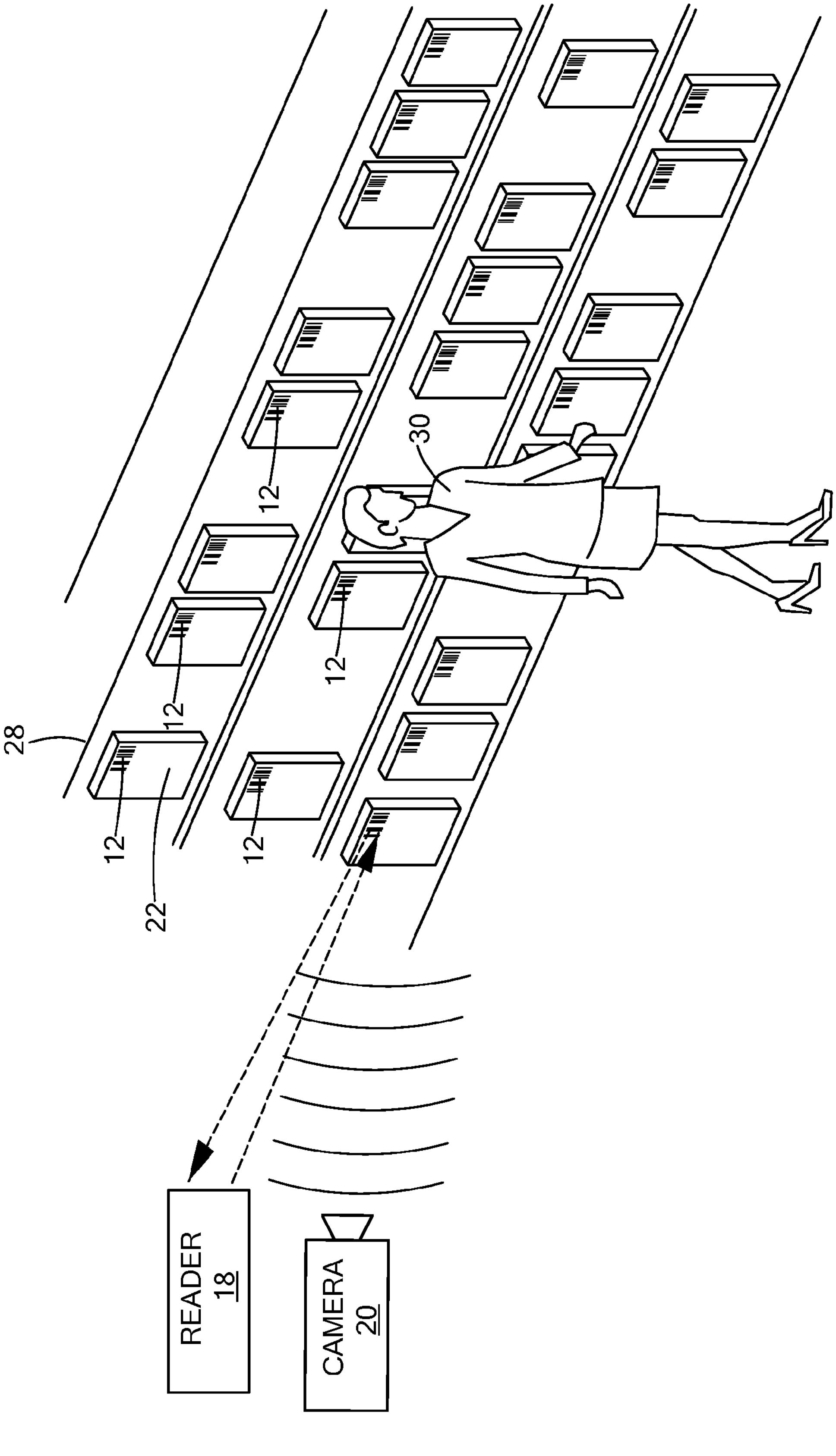
FIG. 4 is a depiction of another exemplary application of the system of FIG. 1 employed at store shelves.

FIG. 4 illustrates yet another embodiment and use of system 10 of the present invention. FIG. 4 shows a series of store shelves or "end caps" (referred to collectively as "shelves 28" or "end caps 28") at a retail store, for example, a supermarket. End caps 28 are displays that are positioned in certain locations, e.g., at the end of an aisle, within the store in order to capture a shopper's attention. A plurality of products 22 reside on shelves 28. During the course of a day, customers remove products 22 from shelves 28. Reader 18 transmits interrogation signals 15 to tags 12 located on each product 22 on shelves 28. Tags 12 respond to interrogation signal 15 with responsive signals 17 thus providing reader 18 with information about each of the products 22 remaining on shelves 28. RFID scans can take place at various time periods. For example, at the end of the day, a store can scan its shelves 28 in the manner described above and determine which products 22 remain on shelves 28, thus allowing the store to determine which products 22 have been purchased. Because stores want to keep shelves 28 stocked with products 22 and want to correlate customer traffic to sales, additional information is required to obtain "real time" inventory information that might be useful to the store in managing their inventory, ordering new products, and determining if some products 22 should be replaced by better selling products 22.

In order to accomplish this, camera 20 is used to capture products 22, shelves 28, and the flow of shoppers 30 around shelves 28. Because RFID scans usually occur periodically, for example at the end of the day, it is advantageous to obtain a "real time" status of the inventory of shelves 28. Camera 20 obtains real time video of shelves 28 and the products 22 on the shelves 28. This information is transmitted in signals to data correlation module 24, where the information can be analyzed, compared to RFID information obtained from reader 18, and/or sent to another location where further analysis can occur. If products 22 do not include RFID tags 12 and instead, contain bar codes that identify and contain information about products 22, the need for video monitoring is even more useful since bar code scanning of a store's inventory may only occur once or twice a year.

Video obtained from camera 20 can provide information relating to which items are removed from shelves 28 and when items are removed from shelves 28 and can serve to notify a retail staff person that the shelves 28 need restocking in a more timely and cost effective manner than simply relying on bar codes and/or RFID identification independently. Camera 20 can also provide video images that can be sent to data correlation unit 16 so data correlation unit 16 can determine if a product 22 was removed from the product support structure and then replaced on the product support structure. This event could relate to customers merely picking up a product, looking at it and then replacing it or it could indicate if a product was removed from its packaging and the packing replaced back on the support structure.

While RFID reader 18 alone can obtain information about which products 22 have been taken from the shelves 28, camera 20 supplies additional, useful information that when either analyzed alone or in combination with data from reader 18, can prove very useful to the store owners. For example, camera 20 can be positioned to determine if the end cap 28 is even positioned in the proper location or has been set up with the proper items. While reader 18 can receive responsive signals 17 from interrogated products 22, it cannot determine if the end cap is positioned in the store where is should be. Camera 20 can capture the exact location of the end cap and alert store personnel if the end cap needs to be moved. Thus, system 10 can determine if the display or end cap is actually on the floor, if it is situated in the correct location, and if it contains the correct products 22.

Camera 20 can also capture color which may also provide valuable real time information about products 22. For example, if orange soda is being displayed on an end cap or stocked on shelves 28 and camera 20 does not detect the presence of orange, but only black, this may indicate that the end cap 28 has run out of orange soda or is stocked with a different soda flavor. Camera 20 can be positioned to also capture images of the store's shoppers. For example, camera 20 can capture images of shoppers 30 walking right by the end cap 28 without even stopping to look at it, images of shoppers 30 stopping to view the products 22 in the shelf or end cap 28, but then not purchasing any, and images of shoppers 30 actually removing products 22 and bringing them to the customer counter for purchase. All of this information may be useful to the store for determining if the end cap 28, in its present location, is achieving the desired results. Further, information regarding the demographics of the shoppers 30 coming into contact with the end cap may provide useful for future use and stocking of the end cap.

Figure 5:
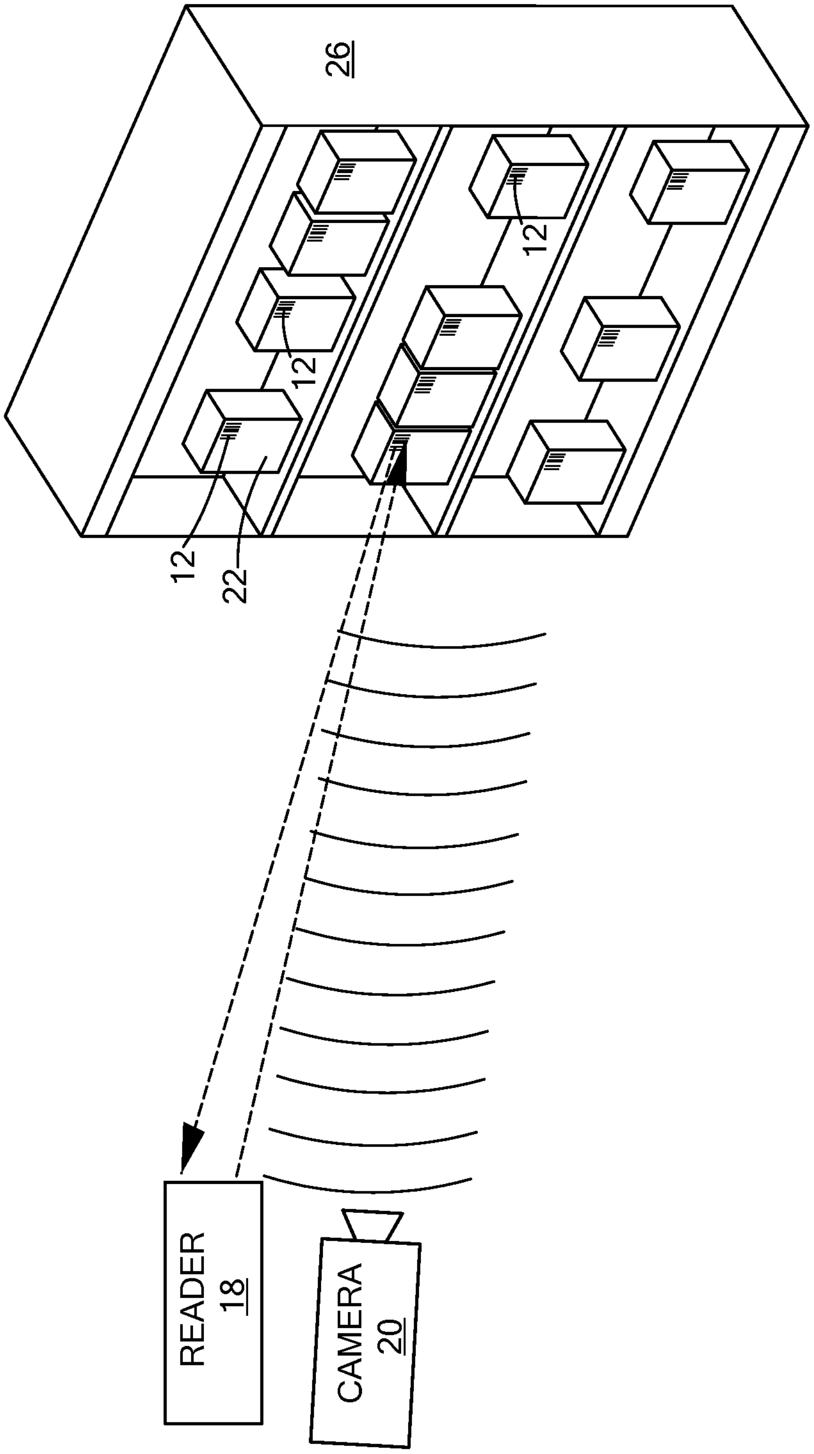
FIG. 5 is a depiction of another exemplary application of the system of FIG. 1 employed at store display.

FIG. 5 illustrates yet another embodiment and use of system 10. In this embodiment, reader 18 and camera 20 are used to detect items in a cart 26 which might be situated, for example, in a store aisle. Carts 26 are often situated in conspicuous locations throughout the store to attract shoppers 30 by offering in-store promotions. Once again, reader 18 can determine the identity of products 22 on cart 26 by interrogating each product 22 and receiving RFID signals in response to the interrogation signal from each product's RFID tag 12. Camera 20 is used to verify that products 22 are being purchased, when the products 22 are being purchased, and by which types of shoppers 30. For example, the shopper 30 may be male or female, above the age of fifty or below, or accompanied by a child. This type of information is captured by camera 20 and once correlated with the information obtained by reader 18 can be used to determine the effectiveness of not only products 22 on cart 26 but also the overall effectiveness of the placement of cart 26 within the store.

Figure 6:
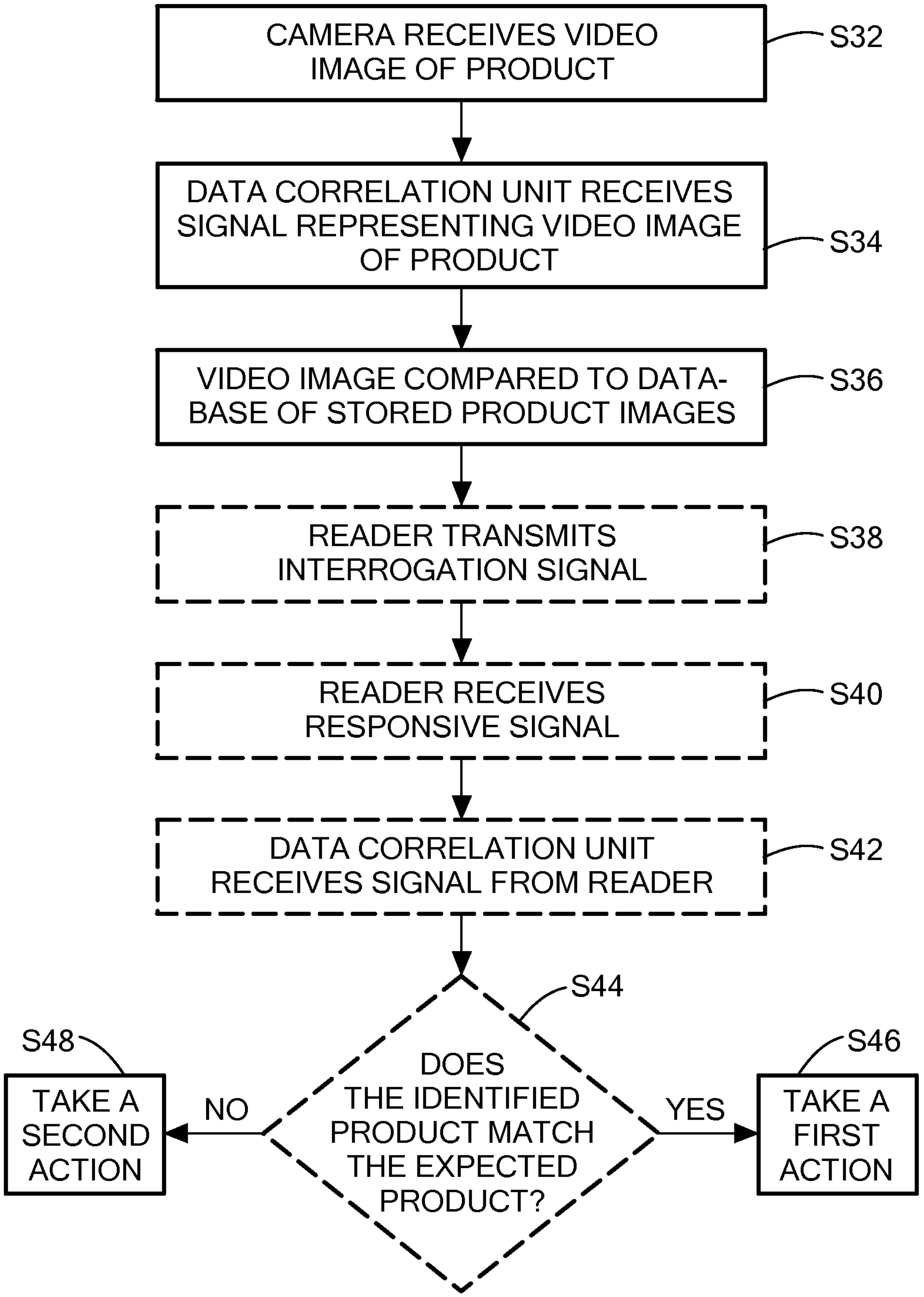
FIG. 6 is a flowchart of an exemplary method of the present invention.

FIG. 6 is a flowchart showing an exemplary product identification process in accordance with an embodiment of the present invention. Camera 20 receives a video image of product 22 within the viewing area (step S32). Data correlation unit 16 receives a signal from camera 20, the signal representing the video image of product 22 (step S34). The video image need not be only of product 22 but might also include shoppers near an end cap containing products as well as video of the end cap or shelves storing product 22. The received video image of product 22 is then compared to a database of stored product images to determine if the product 22 identified by camera 20 is actually the product that is supposed to be at the monitored location (step S36). For example, camera 20 obtains images of a product 22 in a supermarket aisle end cap. The end cap is supposed to be filled with a cola beverage. However, if it is determined, via step S36, that product 22 is in fact a bottle of ginger ale, then certain actions (for example, step S46) can be taken.

In another embodiment, instead of comparing the received video image of product 22 with a database of stored product images to determine the identity of product 22, the video image captured by camera 20 can be compared to video images of products stored on a product support structure such as, for example, an end cap or a cart or store display. In this fashion, whenever a shelf is stocked with new products, a camera captures an image of each product on that shelf and stores the result. Then, when a customer is about to pay for a product 22 at the POS, camera 20 captures an image of the product and transmits a signal representing this image to data correlation unit 16, which compares the image of product 22 with the current stored image of products on the shelf.

In one embodiment, the database of stored images resides in a database that is separate from data correlation unit 16. Data correlation unit 16 forwards the image of product 22 to the remote database. A processor in communication with the database determines the identity of product 22 by comparing the video image of product 22 obtained by camera 20 with the product images stored in the database. Once it has been determined which product stored in the database matches the received image, data correlation unit 16 is then informed of the identity of product 22. In another embodiment, data correlation unit 16 stores the database of product images and, via its own processor, determines the identity of product 22 in the same fashion described above.

In one embodiment, product identification information can be used to further verify the identity of product 22. In this embodiment, reader 18 transmits an interrogation signal directed toward product 22 on, for example, cart 26, shelves 28, conveyor belt carrying products 22 toward a POS terminal, or any other product-storage structure (step S38). Reader 18 receives responsive signals from product identification device 12, whether it is an interrogated RFID tag, a scanned bar code, or the like (step S40). Data correlation unit 16 receives a signal from reader 18, the signal including product identification information obtained by reader 18 from product identification device 12 (step S42). This information includes the identity of product 22. Data correlation unit 16 determines if the product identified by camera 20 is the product that is expected to be in cart 26, shelves 28, the conveyor belt carrying products 22 toward a POS terminal, etc. (step S44) This correlation step (step S34) may occur with or without steps S38-S42. In other words, some scenarios may not require information from reader 18 to verify the product's identity. For example, if products are displayed in an end cap, the retail store owner may only need video information to determine if the products that are on the end cap are the products that actually should be there. In other instances, such as for example at a POS right before checkout, additional corroboration using information obtained from a product identification device 12 (RFID label, bar code, etc.) can be used. In the latter instance, the product 22 identified via video (steps S32-S36 is compared) to the product 22 identified by the signal received by reader 18 from product identification device 14 to determine if there is a match.

If the product 22 identified matches the expected product, a first action is taken (step S46). This action could be, for example, providing an indication to a checkout person at the POS that the product 22 is being purchased legitimately and instructing the checkout person to deactivate any alarms that might sound when the product is removed from the store. Other first actions could be updating inventory or marketing reports. The invention is not limited to the type of actions that could occur once it has been determined, at step S40, that the identified product matches the expected product. If the identified product is not the product that was expected, such as, for example, when a checkout person at the POS scans a different product label than the one affixed to the product 22 being purchased, a second action is taken (step S48). This could be, for example, sounding of an alarm, notifying local security, transmitting an alarm signal to the police or other law enforcement organization, updating an inventory or marketing report, or re-stocking shelves or end caps with the correct product or products 22. The invention is not limited to the type of actions that could occur once it has been determined, at step S44, that product 22 identified in the proceeding steps (either with or without the use of product identification information) is different from the expected product.

The present invention can be realized in hardware, software, or a combination of hardware and software. Any kind of computing system, or other apparatus adapted for carrying out the methods described herein, is suited to perform the functions described herein.

A typical combination of hardware and software could be a specialized or general purpose computer system having one or more processing elements and a computer program stored on a storage medium that, when loaded and executed, controls the computer system such that it carries out the methods described herein. The present invention can also be embedded in a computer program product, which comprises all the features enabling the implementation of the methods described herein, and which, when loaded in a computing system is able to carry out these methods. Storage medium refers to any volatile or non-volatile storage device.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form.

In addition, unless mention was made above to the contrary, it should be noted that all of the accompanying drawings are not to scale. Significantly, this invention can be embodied in other specific forms without departing from the spirit or essential attributes thereof, and accordingly, reference should be had to the following claims, rather than to the foregoing specification, as indicating the scope of the invention.

What is claimed is:

1. A method of using video analytics to obtain sales related information, the method comprising:

capturing a video of a plurality of products residing on a plurality of product support structures, the video including image of persons in proximity to the plurality of product support structures; and analyzing the captured video to:

determine characteristics of the plurality of product support structures and of the plurality of products residing on the plurality of product support structures, the determined characteristics including:

information relating to interaction of at least one person with at least one of the plurality of product support structures;

information relating to interaction of at least one person with at least one product residing on one of the plurality of product support structures; and information relating to when at least one product residing on at least one of the plurality of product support structures was removed from the at least one of the plurality of product support structures;

determine if the at least one person removed one of the plurality of products from associated product packaging;

determine if the product support structure is in a predefined location; and if the product support structure is determined not to be in the predefined location, generate an alert indicating the product support structure is not in the predefined location.

2. The method of claim 1, wherein the determining of characteristics includes determining demographics of the persons in proximity to the product support structure based at least in part on captured video.

3. The method of claim 1, wherein the determining of characteristics includes determining if the removed at least one product was replaced on the product support structure.

4. The method of claim 1, further comprising analyzing the signal from the video capture device to determine if one of the plurality of products was removed from associated product packaging and the product packaging replaced back on the support structure without the product.

5. The method of claim 1, further comprising analyzing the signal from the video capture device to determine if one of the plurality of products on the product support structure does not belong on the product support structure based at least in part on captured video.

6. A system for obtaining sales related information of a plurality of products on a plurality of product support structures, the system comprising:

a video capture device, the video capture device capturing video of a plurality of products residing on a plurality of product support structures, the video including image of persons in proximity to the plurality of product support structures; and a data correlation unit in communication with the video capture device, the data correlation unit:

receiving a signal from the video capture device, the signal representing the video of the plurality of products residing on the plurality of product support structures; and analyzing the signal from the video capture device to:

determine characteristics of the plurality of product support structures and of the plurality of products residing on the plurality of product support structures, the determined characteristics including:

information relating to interaction of at least one person with at least one of the plurality of product support structures;

information relating to interaction of at least one person with at least one product residing on one of the plurality of product support structures; and information relating to when at least one product residing on at least one of the plurality of product support structures was removed from the at least one of the plurality of product support structures;

determine if the at least one person removed one of the plurality of products from associated product packaging;

determine if the product support structure is in a predefined location; and if the product support structure is determined not to be in the predefined location, generate an alert indicating the product support structure is not in the predefined location.

7. The system of claim 6, further comprising a reader in communication with a product identification element, the product identification element associated with one of the plurality of products, the reader receiving a signal containing product identity information from the product identification element.

8. The system of claim 7, wherein the data correlation unit:

receives a signal from the reader, the signal including the product identity information; and Determine if the one of the plurality of products associated with the product identity information matches an image of the one of the plurality of products captured by the video capture device.

9. The system of claim 7, wherein the product identification element is a radio frequency identification (RFID) tag and the signal containing the product identity information is an RFID signal.

10. The system of claim 7, wherein the product identification element is a bar code.

11. The system of claim 6, wherein the video capture device transmits a signal corresponding to the image of the persons to the data correlation unit; and the data correlation unit further analyzes the signal from the video capture device to determine demographics of the persons in proximity to the product support structure based at least in part on the captured images.

12. The system of claim 6, wherein the data correlation unit further analyzes the signal from the video capture device to determine if one of the plurality of products was removed from associated product packaging and the product packaging replaced back on the support structure without the product.

* * * * *